United States Patent [19]
Geffs

[11] 3,838,576
[45] Oct. 1, 1974

[54] INTEGRATED EMERGENCY OXYGEN AND FUEL TANK INERTING SYSTEM

[75] Inventor: Tolman F. Geffs, Malibu, Calif.

[73] Assignee: Parker-Hannifin Corporation, Cleveland, Ohio

[22] Filed: Dec. 15, 1972

[21] Appl. No.: 315,433

Related U.S. Application Data

[63] Continuation of Ser. No. 142,784, May 12, 1971, abandoned, which is a continuation of Ser. No. 849,777, Aug. 13, 1969, abandoned.

[52] U.S. Cl............................ 62/45, 62/53, 62/54
[51] Int. Cl. ........................................... F17c 3/10
[58] Field of Search ............... 62/47, 45, 51, 54, 55

[56] References Cited
UNITED STATES PATENTS

| | | | |
|---|---|---|---|
| 2,453,946 | 11/1948 | Sulfrian................................. | 62/54 |
| 2,657,542 | 11/1953 | Wildhack.............................. | 62/51 X |
| 2,907,177 | 10/1959 | Daley et al........................... | 62/55 X |
| 2,997,855 | 8/1961 | Templer et al. ..................... | 62/51 X |
| 3,030,780 | 4/1962 | Loveday............................... | 62/51 X |
| 3,093,974 | 6/1963 | Templer et al. ..................... | 62/51 |
| 3,318,307 | 5/1967 | Nicastro............................... | 62/55 X |

*Primary Examiner*—William F. O'Dea
*Assistant Examiner*—Peter D. Ferguson
*Attorney, Agent, or Firm*—Donnelly, Maky, Renner & Otto

[57] ABSTRACT

A system for aircraft wherein an inerting fluid (e.g. nitrogen) and oxygen are carried in dewars in liquid form with the nitrogen being employed to cool the oxygen to prevent boil-off. In one system, nitrogen and oxygen dewars have a heat conducting wall therebetween whereby the nitrogen dewar constitutes a heat sink for the oxygen dewar, the vapor pressure of the oxygen being controlled by circulation of the oxygen through an evaporation coil. In another system, liquid nitrogen is bled off from a nitrogen dewar for circulation through a jacketed oxygen dewar, the vapor pressure of the oxygen being controlled by controlling the rate of circulation of the nitrogen through the jacketed oxygen dewar.

3 Claims, 2 Drawing Figures

INVENTOR.
TOLMAN F. GEFFS
BY
Oberlin, Maky, Donnelly & Renner
ATTORNEYS

INTEGRATED EMERGENCY OXYGEN AND FUEL TANK INERTING SYSTEM

This is a continuation of Ser. No. 142,784, filed May 12, 1971, and now abandoned, which, in turn, was a continuation of Ser. No. 849,777 filed Aug. 13, 1969, and now abandoned.

BACKGROUND OF THE INVENTION

Currently, aircraft are being equipped with inerting systems for fire and explosion prevention in which an inert gas (e.g., nitrogen) is conducted into the fuel tanks to remove dissolved oxygen from the fuel and to prevent entrance of air when tank pressure decreases relative to ambient pressure as during descent of an aircraft. In this way explosive vapor mixtures are prevented in the tanks by reducing the oxygen content of the vapor spaces to a level which will not support ignition or explosion. The inert gas may also be conducted to other airframe spaces for fire prevention or fire extinguishment. In these inerting systems, the inert gas is carried in liquid form in dewars, the liquid being converted to gas as and when needed.

However, oxygen for emergency breathing by the pilot, crew, and passengers is generally carried in high pressure (1,850 to 2,200 psi) bottles or cylinders. The oxygen bottles occupy considerable space, are quite heavy and constitute an explosion hazard. For example, an airplane may require eight standard 114 cubic foot oxygen bottles which, when filled, weight 336 lbs., of which only 77.5 lbs. is oxygen, the balance (258.5 lbs.) being the weight of the bottles. Aside from the hazards of high pressure oxygen storage, there are the hazards of recharging of the oxygen bottles in that oil contamination on service fittings may cause explosions or when a fill valve is first opened reflected shock waves to the fill port may generate pressure peaks with associated adiabatic heating and consequent danger of explosion. Several severe fires have resulted from such explosions.

Lightweight liquid oxygen breathing systems which do not create an explosion hazard are presently used in military aircraft, but these systems have high losses due to oxygen boil-off which make them uneconomical for use in commercial aircraft.

SUMMARY OF THE INVENTION

In the integrated nitrogen and oxygen system herein, the oxygen for emergency breathing is carried in liquid form in a closed insulated container at a low pressure of from 30 to 115 psi and is maintained in liquid form and at low pressure by heat transfer to the liquid nitrogen which is used for fuel tank inserting and/or other applications. In contrast to the bottled high pressure oxygen system aforesaid, a dewar having a capacity of 77.5 pounds of liquid oxygen would weigh less than 50 pounds thus to save over 200 pounds in weight over the eight high pressure bottle system. Furthermore, the oxygen dewar herein occupies very little space and need not be as accessible as the oxygen bottles since only periodic inspection is required without removal, and refilling may be safely accomplished through readily accessible disconnect couplings.

The foregoing constitute the principal objects of this invention and other objects and advantages will appear hereinafter.

DETAILED DESCRIPTION OF THE INVENTION

Figure 1:
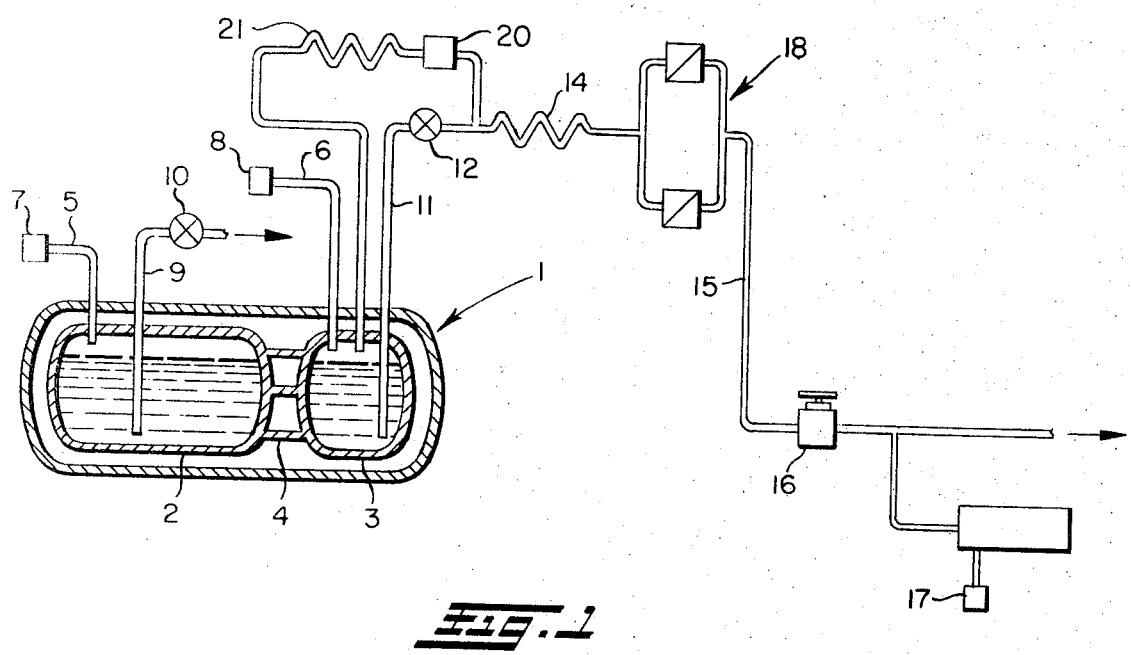
FIG. 1 illustrates an integrated system in which the liquid oxygen dewar and the liquid nitrogen dewar are disposed in direct heat exchange relation.

In the FIG. 1 system there is provided a vacuum insulated dewar assembly 1 providing a container or dewar 2 for liquid nitrogen and an adjacent container or dewar 3 for liquid oxygen, the dewars 2 and 3 being joined together in heat exchange relation as by metal struts 4 extending between the adjacent sides of said containers 2 and 3. The dewars 2 and 3 have fill lines 5 and 6 equipped with disconnect couplings 7 and 8 through which liquid nitrogen and liquid oxygen may be introduced into the respective dewars 2 and 3. Level sensors (not shown) may also be installed in the respective dewars 2 and 3 to discontinue the filling operations thereof when the dewars 2 and 3 are filled to desired level.

The nitrogen dewar 2 has an outlet line 9 (with a shut-off valve 10 therein) which leads to the fuel tanks (not shown) to provide inerting or to other airframe spaces (not shown) into which it is desired to introduce nitrogen for fire prevention or extinguishment or for use as a refrigerant.

The oxygen dewar 3 has an outlet line 11 with a shut-off valve 12 and an evaporator 14 leading to a distribution line 15, the evaporator 14 being effective to transform the liquid oxygen from dewar 3 to gaseous form for breathing. Line 15 connects to pressure regulator 16 and then to oxygen masks 17. The reference numeral 18 in line 15 denotes a control for activation of the oxygen system. The system is activated by the opening of shut-off valve 12.

The liquid nitrogen in the dewar 2 is colder than the liquid oxygen in the dewar 3, therefore, the liquid nitrogen dewar 2 becomes a heat sink for the liquid oxygen dewar 3 via the common heat transfer partition 4 of the dewar assembly 1. In order to build the pressure in the oxygen dewar to the desired value of say, from 30 to 115 psi when the system is activated, there is provided in the dewar 3 circuit, a pressure closing valve 20 and an evaporation coil 21 which leads into the vapor space of the oxygen dewar 3. Thus, when the system is activated, valve 20 will open to permit flow of liquid oxygen through the evaporation coil 21 to heat it and vaporize it, thus to build up the vapor space pressure of dewar 3 to the desired value, at which time, the valve 20 will close.

When a cabin pressure decrease actuates controls 18, liquid oxygen will be forced by the vapor space pressure out of dewar 3 and through line 11 and shut-off valve 12 for flow through the evaporator 14 whereat the liquid oxygen is heated and expands to gaseous state at nearly ambient temperature. Buildup in pressure is limited by valve 20 to say 115 psi, this pressure being sufficient to provide a continuous flow of gaseous oxygen and overcome the line losses in the oxygen distribution line 15. Alternately, the pressure in oxygen dewar 3 can be maintained at working pressure of say 30 to 115 psi throughout flight by connecting valve 20 to line 11 between dewar 3 and shut-off valve 12. By maintaining working pressure in dewar 3, the response time of the system can be made essentially equal to that of the high pressure gaseous oxygen systems presently in use.

As evident, the present system eliminates oxygen loss due to boil-off and therefore according to average usage of oxygen for emergency breathing, one filling of the oxygen dewar 3 may last for several weeks or months. The nitrogen dewar 2 is more frequently filled in view of the constant usage of nitrogen for inerting during each flight.

Figure 2:
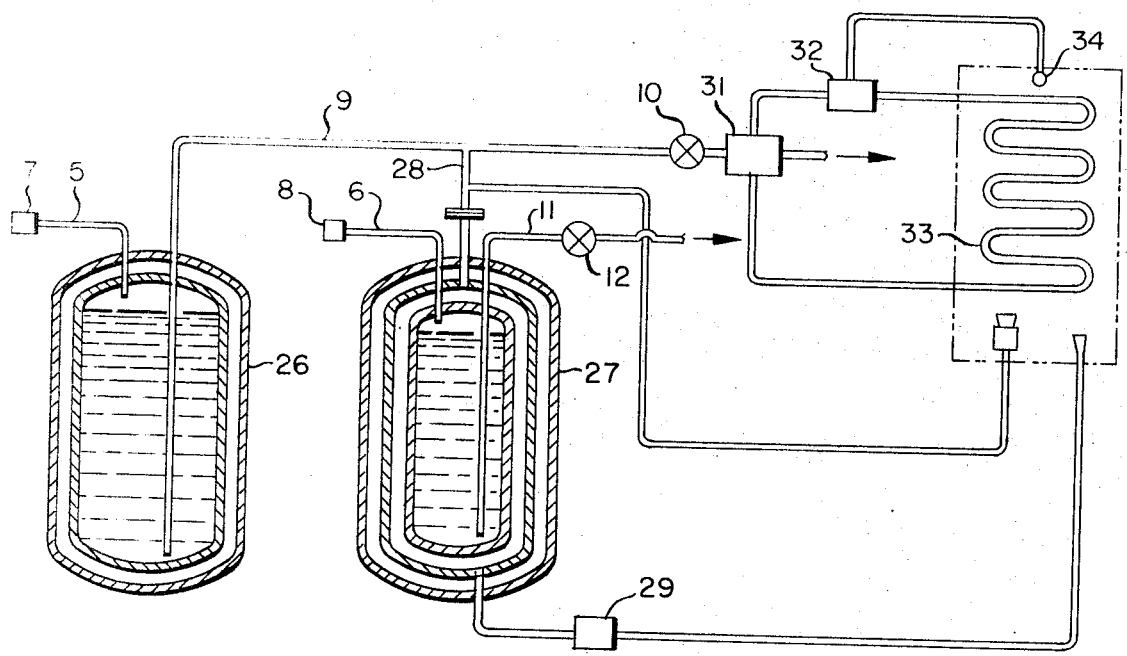
FIG. 2 illustrates a modified integrated system in which liquid nitrogen bled from the liquid nitrogen dewar is circulated through a jacketed liquid oxygen dewar to cool the oxygen in the latter.

In the integrated system illustrated in FIG. 2, the nitrogen and oxygen dewars 26 and 27 are separate and are connected together by conduit 28 for circulation of liquid nitrogen from dewar 26 through the jacketed oxygen dewar 27, the amount of bleed off being controlled by a valve 29. Preferably the nitrogen used for cooling the oxygen is not used for fuel tank inerting purposes but may be used for example to purge out air from a galley refrigerator 30, and if desired the nitrogen used for inerting may constitute a condenser 31 for liquifying the refrigerant of the galley refrigerator 30. In this integrated application, a pump 32 pumps the condensed refrigerant into the evaporator 33 whereat the refrigerant expands to gaseous form to absorb heat. A thermostat 34 in the refrigerator will control operation of the pump 32 and a thermally operated valve 35 may be provided to supply nitrogen into the refrigerator 30 in the event that the bleed valve 29 is closed. Because the nitrogen used for cooling the oxygen does not ever get into the fuel tanks, there is no danger of introducing oxygen into the fuel tanks even though there be rupture or leakage of the oxygen dewar 27. In FIG. 2, the vapor pressure of the oxygen may be maintained at a predetermined value by increasing or decreasing the flow of nitrogen through the bleed valve 29.

I, therefore, particularly point out and distinctly claim as my invention:

1. An integrated aircraft system for emergency oxygen and fuel tank inerting application including containers in which oxygen and nitrogen respectively are stored in liquid form with the nitrogen at a colder temperature than the oxygen, said liquid oxygen container having a pressurized vapor space therein; outlet lines with shutoff valves therein from said containers communicating with the lower portions of the respective liquids in said containers through which the liquid oxygen and liquid nitrogen are conducted for emergency and fuel tank inerting application as aforesaid when said shutoff valves are open; heat transfer means effective to utilize the liquid nitrogen for cooling said liquid oxygen; and vaporization control means intercommunicating the liquid oxygen outlet line with said vapor space and operative selectively to control vaporization of a portion of said liquid oxygen to predeterminedly increase said vapor space pressure and thereafter to maintain such pressure during liquid oxygen storage, thereby to provide a pressure head instantaneously to force such liquid oxygen from its container through the oxygen outlet line for emergency application as aforesaid when its shutoff valve is open; said vaporization control means comprising a pressure responsive valve in communication with said liquid oxygen outlet line which is opened when said vapor space pressure decreases below a predetermined value and which is closed when said vapor space pressure increases to such predetermined value; and evaporation means which receives the liquid oxygen through the opened pressure responsive valve and is operative to heat the same to vaporize it and reintroduce it into said vapor space thus to increase the vapor pressure to said predetermined value; said liquid oxygen outlet line, downstream of its shutoff valve, having in succession a vaporizer, activation control means, a pressure regulator, and a breathing mask.

2. An integrated aircraft system for emergency oxygen and another cryogenic application including containers in which oxygen and a volatile liquid are stored in liquid form with the volatile liquid at a colder temperature than the oxygen, said liquid oxygen container having a pressurized vapor space therein; outlet lines from said containers; heat transfer means comprising a jacketed oxygen container through which said volatile liquid is circulated for cooling said oxygen; means operative selectively to control vaporization of a portion of said oxygen to predeterminedly increase vapor space pressure and thereafter to maintain such pressure during liquid oxygen storage, thereby to provide a pressure head instantaneously to force such liquid oxygen from its container into the oxygen outlet line when such liquid oxygen is in communication with said line; said vaporization control means comprising a bleed valve operative to regulate the flow of volatile liquid through the jacket; and an aircraft refrigerator in which refrigerant is condensed and from which air is purged by said volatile liquid, the flow of volatile liquid in the outlet line from its container being divided, a portion of the flow being directed to a condensor in said refrigerator and the other portion of the flow being directed through said jacket and into said refrigerator for purging air therefrom.

3. The system of claim 2 wherein said flow through the jacket and into the refrigerator has a bypass means to direct the volatile liquid to the refrigerator when said bleed valve which controls flow through said jacket is closed.

* * * * *